United States Patent [19]

Smart

[11] 4,260,256

[45] Apr. 7, 1981

[54] APPARATUS FOR MEASURING ILLUMINANCE

[75] Inventor: David C. Smart, Penfield, N.Y.

[73] Assignee: Eastman Kodak Company, Rochester, N.Y.

[21] Appl. No.: 961,800

[22] Filed: Nov. 17, 1978

[51] Int. Cl.³ .......................... G01J 1/40; G01J 1/42; H01J 40/14
[52] U.S. Cl. .................. 356/235; 356/225; 250/211 R
[58] Field of Search ............... 356/235, 230, 225; 350/314, 317; 250/226, 211 K, 211 R

[56] References Cited

U.S. PATENT DOCUMENTS

| | | | |
|---|---|---|---|
| 2,527,800 | 10/1950 | Dorsey | 354/49 |
| 2,740,901 | 4/1956 | Graham | 250/201 |
| 2,806,405 | 9/1957 | Amand | 356/225 |
| 2,896,086 | 7/1959 | Wunderman | 250/211 K |
| 3,013,232 | 12/1961 | Lubin | 338/17 |
| 3,028,500 | 4/1962 | Wallmark | 250/211 |
| 3,149,968 | 9/1964 | Stephens | 350/314 |
| 3,193,687 | 7/1965 | Hatcher | 350/314 |
| 3,205,767 | 9/1965 | Weber et al. | 354/79 |
| 3,409,378 | 11/1968 | Shimomura | 356/222 |
| 3,723,934 | 3/1973 | Kubitzek | 338/15 |

FOREIGN PATENT DOCUMENTS 2304826  8/1974  Fed. Rep. of Germany ........... 356/225

Primary Examiner—Vincent P. McGraw
Assistant Examiner—Rodney B. Bovernick
Attorney, Agent, or Firm—D. R. Arndt

[57] ABSTRACT

An apparatus for measuring the intensity of light reflected from a scene along an optical path includes a photoelectric cell, an optical lens and a light-attenuating device that has a gradation of opacity along one dimension that extends generally transversely to the optical path. The device may be moved transversely of the optical path to vary the average amount of light impinging upon the cell. The cell has a gradation of sensitivity to light along a dimension that extends generally transversely of the optical path. The sensitivity varies along the cell dimension and the cell is so disposed so as to be correspondingly more sensitive to light that has passed through more opaque portions of the light attenuating device and less sensitive to light that has passed through less opaque portions of the light attenuating device. The apparatus may be incorporated in a photographic camera and may be coupled to the camera's exposure control mechanism.

4 Claims, 5 Drawing Figures

APPARATUS FOR MEASURING ILLUMINANCE

BACKGROUND OF THE INVENTION

1. Field of the Invention

The invention relates to an apparatus for use in measuring the reflected light intensity of a scene. More particularly the invention relates to an improved apparatus that includes means for attenuating the scene light being measured without causing the apparatus to have unequal sensitivity to light being reflected from different portions of the scene.

2. Description Relative to the Prior Art

It is well known to use a photoelectric cell in an apparatus to measure the reflected light intensity or illuminance of a scene. Such measurement can then be used to determine the correct setting for an exposure-control mechanism in a photographic camera or for other purposes. The photoelectric cell produces an electrical current or varies the resistance in an electrical circuit in approximate proportion to the average intensity of illumination reflected by the scene on a photosensitive surface in the image area (the total area on a surface of the photoelectric cell onto which an image of the scene is focused) of the photoelectric cell. An optical lens is included in the apparatus to direct the image of the scene to be measured onto the image area of the photoelectric cell.

Often a light-attenuating device is included in the apparatus and is positioned between the photoelectric cell and the scene to produce a known set of exposures on the photoelectric cell. One type of light-attenuating device is an optical wedge which in general consists of a strip of material—glass, celluloid or plastic—covered with a pigment or developed silver emulsion layer which is clear at one end and gradually becomes opaque towards the other end. The transition from clear to opaque usually takes place smoothly but may take place in regular steps in which case it is called a step wedge. Such a device is mounted to be moved transversely with respect to the optical path, this lateral movement being parallel to the direction of the density gradient of the device so that the average intensity of the radiation falling on the photoelectric cell image area can be attenuated to a desired degree. Such a device can be used by moving it laterally to keep the radiation intensity within the working range of the photoelectric cell; or it can be used to keep the average intensity of radiation falling on the entire photoelectric cell image area at a constant level. The position of the device thus serves as a means for indicating the proper exposure setting for a photographic camera. It is also known to have the device coupled to the exposure-control mechanism of a camera, so that when the device is moved to keep the average intensity of light impinging on the photoelectric cell image area constant, a proper setting of the exposure-control mechanism occurs automatically.

One problem with such a radiation-attenuating device is that the use of such an optical wedge inherently attenuates light impinging upon one side of the photoelectric cell image area more than it attenuates light impinging upon the other side. The result is a weighted "measurement" of the scene by the photoelectric cell, i.e., the photoelectric cell will give more weight to its measurement of illumination of some portions of the image than to others. In nonhomogeneous scene lighting conditions this weighting (or, in effect, sensitivity distortion) can often result in an incorrect determination of the proper exposure setting for a camera.

The prior art discloses a mechanism intended to solve this problem. U.S. Pat. No. 2,806,405 suggests placing a second optical wedge, fixedly positioned, in the optical path to compensate for the sensitivity-distorting effect of the movable first optical wedge. The density gradient of the second optical wedge has a sense opposite to that of the first to thereby provide a more uniform illumination of the area of the photoelectric cell. A number of disadvantages are associated with such a mechanism. Firstly, the positioning and mounting of another element in the optical path requires more space and increases the likelihood for error in the mounting of all of the other elements in the optical path. Secondly, the presence of another optical wedge in the optical path inherently increases the diffusion of radiation on its way to the photoelectric cell. This means that any given portion of scene light (i.e., unit area) impinging on the light sensitive area of the photocell is less likely to correspond to the actual light intensity of the corresponding portion of the scene. Thirdly, having another optical wedge or gradient in the optical path necessarily decreases the apparatus' overall sensitivity to radiation by constantly keeping a certain percentage of the radiation from reaching the photoelectric cell. The present invention is directed to providing an apparatus that minimizes the problem of sensitivity distortion caused by the light-attenuating device while also minimizing all of the above-noted disadvantages of the solutions suggested in the prior art.

SUMMARY OF THE INVENTION

The present invention provides an improved apparatus for measuring the reflected light intensity or illuminance of a scene. The apparatus comprises a photoelectric cell that defines a structure having an image area. Portions of this image area support a photosensitive surface that causes or allows an electrical current to flow in a circuit in proportion to the intensity of radiation striking the photosensitive surface. An optical lens is also included in the apparatus between the photocell and the scene in order to collect and focus scene light to illuminate the image area of the photocell with an image of the scene that may be blurred or indistinct but that embodies the same luminance distribution as the scene.

The apparatus further comprises a light-attenuating device such as an optical wedge having a gradation (a gradual passing from one tint or shade to another) of opacity along one dimension that extends generally transversely to the optical path. Preferably, the device is mounted in the apparatus such that it can be moved in a lateral direction with respect to the optical path. The attenuating device provides different degrees of transmittance to the light traveling along the optical path.

The improvement of the invention resides in the photosensitive surface supported by the image area of the photocell. The photosensitive surface is designed to provide a gradation of sensitivity to light along one dimension thereof. This dimension extends generally transverse to the optical path so as to be correspondingly more sensitive to light that has passed through the more opaque portions of the light attenuating device and correspondingly less sensitive to light that has passed through the less opaque portions of the light attenuating device. This sensitivity gradient in the photocell results from the way a photosensitive filament is installed on the image surface of the cell. If the wedge and cell are on the same side of the lens, the gradation of transparency of the wedge is opposite in sense to the gradation of sensitivity of the cell but the gradation of density or opacity of the wedge has the same sense as the gradation of sensitivity of the cell.

The apparatus of the invention thus minimizes the problem of sensitivity distortion or weighting caused by the optical wedge. It does not require that an additional element be placed in the optical path of the apparatus. Therefore, a solution to the above problem is provided by my invention which results in a more efficient utilization of space, a reduction in the likelihood of error in mounting the various elements in the optical path, and minimization of diffusion of scene light on its way to the photocell. In addition, my invention allows more radiation to pass to the photoelectric cell and the apparatus' overall sensitivity to radiation is not reduced, as it would be if a second optical density gradient (having a minimum density greater than zero) were placed in the optical path as the above prior art suggests.

The apparatus of the invention is a useful instrument for measuring the illumination of an image of a scene or may be used to measure the intensity of a source where it is desired that a uniform reading be obtained over a relatively large area. The apparatus thus may be incorporated in a television camera or in a photographic camera for making still or moving pictures, wherein it serves to control the proper exposure setting for the camera in relation to a given scene. The apparatus also is amendable to being incorporated in a camera wherein the light or radiation-attenuating device is coupled to the exposure-control mechanism of the camera, so that instead of merely indicating the proper setting for correct exposure, the movement of the radiation-attenuating device automatically causes the proper setting of the camera's exposure controlling members to be made.

DESCRIPTION OF THE PREFERRED EMBODIMENTS

Figure 1:
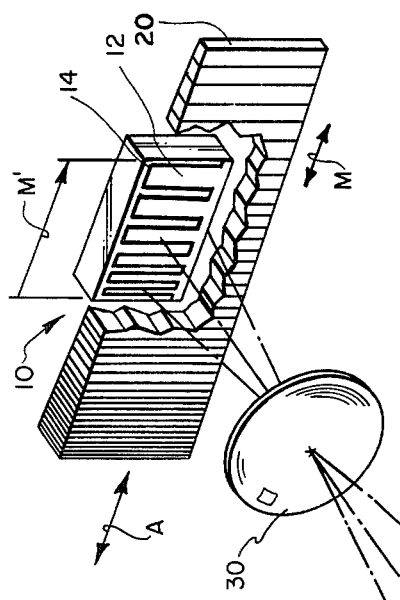
FIG. 1 is an illustration of the elements and their arrangement thereof in an apparatus comprising a preferred embodiment of my invention.

Referring to FIG. 1, there is shown a photoelectric cell 10, a radiation or light-attenuating device such as an optical wedge 20, a positive optical lens 30, and a scene 40. Reflected light from the scene 40 enters the apparatus of the invention through the optical lens 30, which is designed and mounted by suitable conventional means to focus an image of the scene onto the total image area 12 of the photoelectric cell 10. Photoelectric cell 10 as used herein is intended to include types of cells whose electrical properties are modified by the action of light. Before striking the image area 12, however, the light from the scene 40 must pass through the optical wedge 20. The optical wedge 20 is a wedge-shaped light-attenuating device comprising a material having a uniform optical density. The wedge shape of the device produces a gradient of optical density along the lateral dimension M. Device 20 is mounted by suitable conventional means of the cell for movement in the directions illustrated by arrow A such that it can be used to modify the amount that light will be attenuated when passing through it to the photocell 10. As may be noted from the drawing, the direction of movement A is generally transverse to the optical path illustrated by the rays of light. In addition, the dimension M of the device is arranged so that it too is generally transverse to the optical path.

Figure 2:
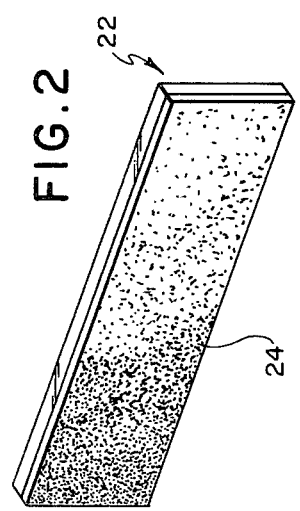
FIG. 2 is an illustration of an alternative radiation-attenuating device which is a part of another embodiment of the apparatus of my invention.

An alternative light-attenuating device 22, illustrated in FIG. 2, can be substituted for device 20 in FIG. 1. Device 22 is not wedge-shaped but has a uniform thickness and continuously varying opacity. Its optical density gradient (change in the value of a quantity per unit distance in a specified direction) can be produced by coating a surface 24 of a suitable transparent substrate with an optically dense material, e.g., by using a continuously varying coating on the substrate to produce a coating on surface 24 containing a continuously varying concentration of optically dense material. Alternatively, device 22 can be a strip of photographic film whose photosensitive surface 24 has been subjected to a continuously varying exposure and then developed to produce a gradient of optical density.

Returning now to FIG. 1, it will be appreciated that device 20 will always attenuate the radiation that is directed by optical lens 30 toward one side of the image area 12 more than it will attenuate radiation directed toward the other side of the image area. To compensate for this effect, the image area 12 of the photocell 10 is also provided with a gradient of light-sensitivity in a dimension M'. When the device 20 is between the lens and the cell this gradient of light sensitivity is made opposite in sense to the gradient of transmittance of the optical wedge 20. In the embodiment illustrated in FIG. 1 the gradient of light sensitivity for the photocell 10 is produced by varying the amount of photosensitive surface 14 over the total image area 12 in a direction which is opposite in sense to the transmissivity gradient of the optical wedge and has the same sense as the density or opacity gradient of the optical wedge. Stated differently, the amount of photosensitive surface 14 is so varied across the total image area 12 along the dimension M' to provide the cell with a gradient of sensitivity that varies inversely to the gradient of transmittance of the optical wedge. Thus the cell is disposed so that it will be correspondingly more sensitive to light that passes through more-opaque portions of the device 20 and correspondingly less sensitive to light that has passed through less opaque portions of the device 20. It will be appreciated therefore that the apparatus provides a substantially uniform sensitivity to light from all portions of the scene. It should be noted that other devices could be placed in the optical path to weight the sensitivity toward one or more portions of the scene, a situation that may be desirable in some applications; (e.g., where a center-weighted reading of a scene is preferred) such devices would be within the skill of those in the art.

Figure 3:
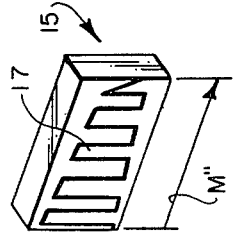
FIG. 3 illustrates an alternative arrangement of the photosensitive surface in the image area of the photoelectric cell for use in still other embodiments of an apparatus that incorporates my invention.

In FIG. 3, an alternative photoelectric cell arrangement is shown, which could be substituted for photoelectric cell 10 in FIG. 1, but is less preferred. Photoelectric cell 15 of FIG. 3 has a photosensitive surface 17 the area of which varies along a dimension M'', but it is an "amplitude" type of variance, rather than the "frequency" variance illustrated by photoelectric cell 10 in FIG. 1. The arrangement of FIG. 3 would adequately compensate for the presence of the optical transmissivity gradient but would itself cause the apparatus to be somewhat less sensitive to radiation from two corner portions of the scene (the two corners where the "amplitude" is lowest). Nevertheless, it would be adequate for many applications.

Figure 4:
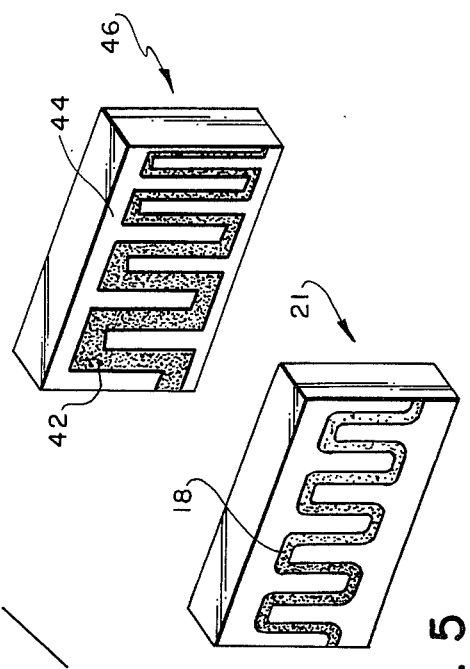
FIG. 4 illustrates a third alternative arrangement of how the sensitivity gradient can be established by varying the amount of photosensitive material in a filament as the filament is coated across the face of the photoelectric cell.

FIG. 4 illustrates another embodiment, which could be substituted for the photoelectric cell 10 in FIG. 1. The photosensitive surface 42 on the photoelectric cell 46 varies in width over the total image area 44 in a direction which would be opposite in sense to the transmissivity gradient of the optical wedge.

Figure 5:
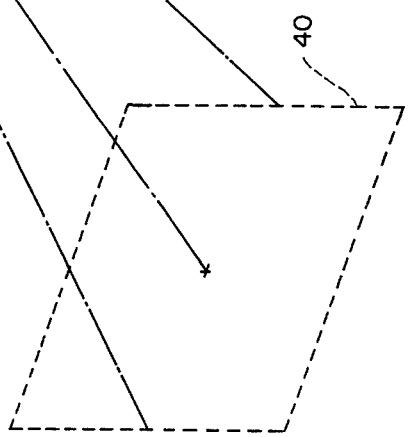
FIG. 5 illustrates a fourth arrangement wherein the amount of photosensitive material per unit area of photosensitive surface is varied instead of varying the area of the photosensitive surface per unit image area.

It should also be noted that other arrangements of the photoelectric cell can be used to produce different gradients of light-sensitivity. For example, the amount of photosensitive material per unit area of photosensitive surface could be varied, rather than varying the area of photosensitive surface per unit image area, to produce approximately the same effect. Such an arrangement illustrated in FIG. 5 wherein the amount of photosensitive surface 17 is greater on one portion of the image area 18 and is reduced in amount as the photosensitive surface moves across the surface of the photoelectric cell 21. It will be appreciated that other arrangements for varying the area of photosensitive surface over the length of the total image are also possible, though not illustrated.

Those of ordinary skill in the art will recognize that the photoelectric cell may be of the photo-conductive type (changing electrical resistance in response to radiation) or photo-emissive type (generating electrical current in response to radiation) or photovoltaic (generating an electromotive force in response to radiation) and that the photosensitive surface may be sensitive to areas of the spectrum of electromagnetic radiation other than, or in addition to, the visible spectrum. Typical of the photosensitive materials used in photocells are cadmium sulfide or cadmium selenide in photo-conductive cells and germanium or silicon in photoelectric cells.

It will also be recognized that the gradient of optical density of the light attenuating device and the gradient of radiation-sensitivity of the photoelectric cell will not always be linear or equal to each other in all embodiments. This may be desirable, for example, in situations where one wishes the photoelectric cell's response curve to vary with the intensity of radiation coming from a scene in order to compensate for the variance in the exposure-response curve of a specific photographic film. Thus, the gradients will be modified to conform to the characteristics of the specific photographic film used.

As mentioned previously, embodiments incorporating the invention may be used in a still or moving picture camera and calibrated so that an indication may be provided for the proper exposure setting for the camera in relation to any given scene. In other embodiments, the apparatus is incorporated in a camera and the radiation-attenuating device is coupled (by any of a number of means that will be readily apparent to those of ordinary skill in the art) to the exposure-control mechanism of the camera. In such embodiments movement of the light-attenuating device, rather than just indicating the proper setting for correct exposure, causes the proper setting of the exposure-control mechanism to be made automatically.

It should be noted that the light-attenuating device in the automatic mode can be moved laterally until the amount of light passing through the attenuating device results in an electrical current in the photoelectric cell equal to some predetermined value, whereby the lateral position of the light-attenuating device may be used to correspondingly indicate the level of illumination required for a correct exposure setting or as the means for actually making the proper setting of the exposure-control mechanism in a camera.

The invention has been described with reference to particular preferred embodiments thereof, but it will be understood that variations and modifications can be effected within the spirit and scope of the invention.

I claim:

1. In apparatus for use in measuring the intensity of light along an optical path, said apparatus including:
    a photoelectric cell;
    an optical lens disposed in the optical path between said photoelectric cell and a scene;
    light attenuating means having a gradation of opacity along a dimension extending generally transversely to said optical path, said means being disposed in the optical path for relative movement along a predetermined movement path that is generally transverse to the optical path to provide different degrees of transmittance to light traveling along the optical path, the improvement comprising:
    means providing said photoelectric cell with a gradation of sensitivity to light along one dimension extending generally transversely to said optical path and generally parallel to said movement path, said sensitivity varying along said cell dimension and said cell being so disposed so as to be correspondingly more sensitive to light that has passed through more opaque portions of the light attenuating means and correspondingly less sensitive to light that has passed through less opaque portions of the light attenuating means, thereby providing variable attenuation at said photoelectric cell while preserving substantially uniform sensitivity across said cell.

2. The invention according to claim 1 wherein the gradation of opacity of the light attenuating means is substantially linear and the gradation of sensitivity to light of the photoelectric cell is substantially linear.

3. In a photographic camera containing apparatus for use in measuring light along an optical path in order to determine the correct setting of an exposure control mechanism in said camera, said apparatus including:
    a photoelectric cell defining an image area and having a photosensitive surface within said image area;
    an optical lens disposed in the optical path between said photoelectric cell and a scene to form an image of said scene on said image area; and
    a light attenuating device having a gradation of opacity in a direction generally transverse to said optical path, said means being disposed in the optical path for relative movement along a predetermined movement path that is generally transverse to the optical path to provide different degrees of transmittance to light traveling along the optical path, the improvement comprising:

means providing a photosensitive surface with a gradation of sensitivity to light along a dimension extending generally transversely to said optical path and generally parallel to said movement path, said sensitivity varying along said surface dimension and said cell being so disposed so as to be correspondingly more sensitive to light that has passed through more opaque portions of the light attenuating device and correspondingly less sensitive to light that has passed through less opaque portions of the light attenuating device, whereby movement of said light attenuating device provides variable attenuation of the light reaching the photoelectric cell while preserving substantially uniform sensitivity to light across said photosensitive surface.

4. In a photographic camera including:

a photoelectric cell having a photosensitive surface region;

an optical lens disposed along an optical path between said photoelectric cell and a scene to form an image of the scene on a predetermined image area of the photoelectric cell, which area includes the photosensitive surface region of the cell; and a light attenuating element disposed in the optical path for relative movement along a predetermined movement path that is generally transverse to the optical path and generally parallel to the movement path, said element being of progressively increasing opacity in a predetermined direction along the movement path, the improvement comprising:

means providing said photosensitive surface with progressively increasing sensitivity to light corresponding to the progressively increasing opacity of said light attenuating element and oriented with respect to the element such that scene light of a particular intensity received by said photosensitive surface through a relatively opaque region of said light attenuating element produces the same cell response per unit area of the photosensitive surface as does light of the same intensity received by said photosensitive surface through a relatively less opaque region of said light attenuating element, thereby providing the photocell with sensitivity at any one point that may change in response to said movement of the light attenuating means while preserving across the photoelectric cell a substantially uniform sensitivity to light.

* * * * *